United States Patent
Singhal et al.

(10) Patent No.: US 7,182,929 B1
(45) Date of Patent: Feb. 27, 2007

(54) NANOSTRUCTURED MULTI-COMPONENT AND DOPED OXIDE POWDERS AND METHOD OF MAKING SAME

(75) Inventors: Amit Singhal, Piscataway, NJ (US); Ganesh Skandan, Piscataway, NJ (US); Mohit Jain, Sayreville, NJ (US)

(73) Assignee: NEI, Inc., Piscataway, NJ (US)

( * ) Notice: Subject to any disclaimer, the term of this patent is extended or adjusted under 35 U.S.C. 154(b) by 207 days.

(21) Appl. No.: 10/920,898

(22) Filed: Aug. 18, 2004

Related U.S. Application Data

(60) Provisional application No. 60/495,824, filed on Aug. 18, 2003.

(51) Int. Cl.
*C01G 1/00* (2006.01)

(52) U.S. Cl. .............. 423/592.1; 423/593.1; 423/600; 423/594.16; 423/111; 423/155; 423/625; 423/594.14; 423/99; 423/598; 423/69; 423/335; 423/326; 423/610; 423/263; 423/21.1; 423/632; 423/633; 423/138; 423/635; 423/608; 423/618; 423/89; 423/622; 977/773; 977/775; 977/776; 977/777; 977/811

(58) Field of Classification Search .............. 423/592.1, 423/593.1, 600, 594.16, 111, 155, 625, 594.14, 423/99, 598, 69, 335, 326, 610, 263, 21.1, 423/632, 633, 138, 635, 608, 618, 89, 622; 977/773, 775, 776, 777, 811
See application file for complete search history.

(56) References Cited

U.S. PATENT DOCUMENTS

| | | | |
|---|---|---|---|
| 6,832,735 B2 * | 12/2004 | Yadav et al. .................... 241/16 |
| 2003/0143153 A1 * | 7/2003 | Boulos et al. ............ 423/592.1 |
| 2003/0175004 A1 * | 9/2003 | Garito et al. ................ 385/143 |
| 2003/0202770 A1 * | 10/2003 | Garito et al. ................ 385/141 |
| 2005/0063889 A9 * | 3/2005 | Yadav et al. ................. 423/263 |

* cited by examiner

*Primary Examiner*—Timothy C. Vanoy
(74) *Attorney, Agent, or Firm*—William L. Botjer

(57) ABSTRACT

A method for producing nanostructured multi-component or doped oxide particles and the particles produced therein. The process includes the steps of (i) dissolving salts of cations, which are either dopants or components of the final oxide, in an organic solvent; (ii) adding a dispersion of nanoparticles of a single component oxide to the liquid solution; (iii) heating the liquid solution to facilitate diffusion of cations into the nanoparticles; (iv) separating the solids from the liquid solution; and (v) heat treating the solids either to form the desired crystal structure in case of multi-component oxide or to render the homogeneous distribution of dopant cation in the host oxide structure. The process produces nanocrystalline multi-component or doped oxide nanoparticles with a particle size of 5–500 nm, more preferably 20–100 nm; the collection of particles have an average secondary (or aggregate) particle size is in the range of 25–2000 nm, preferably of less than 500 nm.

22 Claims, 8 Drawing Sheets

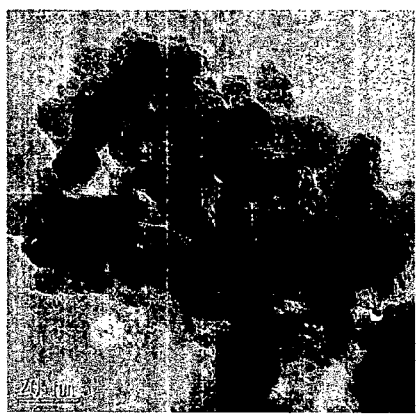 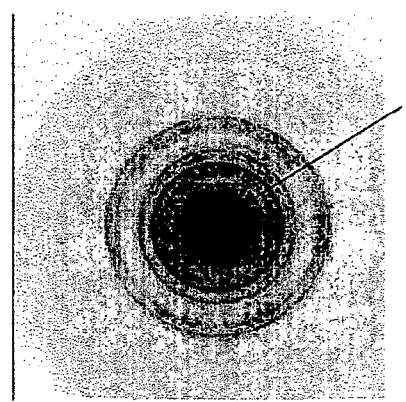
(111) diffraction ring of MgAl$_2$O$_4$
Fig. 4a         Fig. 4b

NANOSTRUCTURED MULTI-COMPONENT AND DOPED OXIDE POWDERS AND METHOD OF MAKING SAME

CROSS REFERENCE TO RELATED APPLICATIONS

This application claims priority of U.S. provisional application No. 60/495,824 filed Aug. 18, 2003.

STATEMENT OF GOVERNMENT SUPPORT OF INVENTION

The work leading to the present invention was supported by a U.S Army SBIR program under contract DAAH01-03-C-R147

BACKGROUND OF THE INVENTION

This invention relates to the production of doped and multi-component oxide ultrafine- or nano-particles (i.e. particles of less than 1 micron and preferably in the size range of 5–500 nm).

Nanomaterials-derived products are being actively pursued for use in a wide range of applications, including electrochemical energy storage and generation, chemical sensors, optoelectronics, semiconductors, wear and scratch resistant coatings, and heat transfer. The interest stems from the fact that researchers see immense potential for improving functional properties of components and devices by nanostructuring. In some cases, the use of nanoparticles as feedstock material can facilitate processing of an improved end product at a lower cost. However, while the use of nanoparticles as starting material can lead to benefits in a number of applications, researchers must tailor the structure and composition of the starting powder in order to maximize the property enhancements and performance and realize the true potential of nanomaterials.

Over the past several years, a number of techniques have been developed for the production of ceramic nanoparticles. These include: laser ablation, microwave plasma synthesis, precipitation from a solution, spray pyrolysis, plasma arc synthesis, hydrodynamic cavitation, and gas condensation using either a physical evaporative source or chemical precursors. Vapor phase processes are capable of producing well-defined spherical nanoparticles with narrow particle size distribution. Several single component oxides can be produced by an atmospheric flame process at low cost. However, it is extremely difficult to control the composition of multi-component (two or more cations in the chemical formula) and doped (one or more cations present in the lattice of the host compound) ceramic powders because of the significant variations in the vapor pressures of different constituents. On the other hand, solution-based processes can be used to exercise excellent control on the composition, but particle characteristics are not as good as those produced by any of the vapor phase processes. The synthesis method discussed in this patent application bridges the gap between liquid and vapor phase processing routes to produce nanostructured doped/multi-component ceramic powders, such as, $MgAl_2O_4$, $SiO_2$:Eu, $LiNbO_3$, $TiO_2$: Er, ZnO:Al and $SnO_2$:Sb, with well-defined particle characteristics.

Doped and multi-component oxide nanopowders are needed in a broad range of applications. For example, polycrystalline $MgAl_2O_4$ spinel is an infrared window material, because of its excellent optical properties. This material can be used to fabricate infrared windows and domes for a variety of military applications. Infrared transparent windows can also be widely used in the commercial sector, ranging from industrial optical lasers systems to barcode readers in supermarket checkout counters. Nanocrystalline $MgAl_2O_4$ powders can be sintered to form fine grained (~1 µm) spinel, which has the potential to possess excellent mechanical properties at ambient as well as at high temperatures. Additionally, polycrystalline spinel will be much cheaper in cost compared to sapphire: manufactured using an expensive, albeit highly optimized molten ceramic process. On the other hand, sintering powders to form polycrystalline spinel in principle is an inexpensive process.

Doped metal-oxide nanoparticles (e.g., luminescent and electrically conducting materials) with controlled particle characteristics are required in several applications, including optical displays, electrochromic devices, sensors, optoelectronic devices and several lighting applications. For example, luminescent materials, such as phosphors, are compounds that are capable of emitting visible and/or ultraviolet rays upon excitation of the material by an external energy source. Phosphor powders are used in several applications, such as liquid crystal displays, cathode ray tube (CRT), plasma displays, thick film and thin film electroluminescent displays. In order to achieve high luminescent intensity and long life time that are required in several applications, phosphor powders should possess high purity, high crystallinity, narrow particle size distribution, small particle size, spherical morphology, homogenous distribution of activator ion and low porosity. Additionally, luminescent nanopowders are desired for the development of fluorescent labels. These materials offer significant advantages over organic dyes because of their longer half life, broad excitation spectrum, narrow, symmetric emission spectrum and minimal photo bleaching.

SUMMARY OF THE INVENTION

This invention relates to the method of making a variety of multi-component and doped ceramic powders for a broad range of applications. Applications, such as photonic devices, electrochemical devices, and chemical sensors, require ceramic nanopowders with such well-defined properties. This invention focuses on developing a wet-chemistry method that utilizes nanoparticles of single-component oxides as starting material. Nanoparticles of single component oxides (e.g., $Al_2O_3$, $CeO_2$, $SiO_2$, $Y_2O_3$, $ZrO_2$, ZnO and $SnO_2$) are now becoming readily available on a large scale at a competitive price, and such single-component materials can be the precursor for doped/multi-component ceramic powders while keeping the pristine particle characteristics intact. This is the basis of our low cost Diffusion Assisted Low Temperature (DALT) process, which enables the synthesis of doped/multi-component nanopowders with tailored particle characteristics that are required for specific applications.

The method for producing nanostructured multi-component or doped oxide particles, includes the steps of (i) dissolving salts of cations (e.g., Mg in case of $MgAl_2O_4$), which are either dopants or components of the final oxide, in an organic solvent; (ii) adding a dispersion of nanoparticles of a single component oxide (e.g., $Al_2O_3$ in case of $MgAl_2O_4$) to the liquid solution; (iii) heating the liquid solution to facilitate diffusion of cations into the nanoparticles; (iv) separating the solids from the liquid solution; and (v) heat treating the solids either to form the desired crystal structure in case of multi-component oxide or to render the homogeneous distribution of dopant cation in the host oxide structure. The process produces nanocrystalline multi-component or doped oxide nanoparticles with a particle size of 5–500 nm, more preferably 20–100 nm; the collection of particles have an average secondary (or aggregate) particle size is in the range of 25–2000 nm, preferably of less than 500 nm.

BRIEF DESCRIPTION OF THE DRAWINGS

For a better understanding of the invention, reference is made to the following drawings which are to be taken in conjunction with the detailed description to follow in which:

FIG. 4 (a) is a TEM micrograph; and 4(b) the diffraction pattern of $MgAl_2O_4$ nanopowder prepared in a decanol solution, and annealed at 800° C. produced in accordance with the present invention.

DESCRIPTION OF THE PREFERRED EMBODIMENTS

Multi-Component Nanopowders

Synthesis of $MgAl_2O_4$ Spinel Nanopowders Using the DALT Process

Nano—$MgAl_2O_4$ powders can be sintered to form fine grained transparent windows. Fabricating dense and transparent polycrystalline spinels with a fine grained structure has been an elusive target until now, primarily because of the unavailability of sinterable and high purity powders with reproducible properties. Conventional processing of micron-sized powders into transparent ceramics leads to grain sizes in the range of 20–50 μm range, and mechanical properties of fine grained cubic materials are expected to be superior to their coarse grained counterparts because of the Hall-Petch relationship (i.e. increasing strength with decreasing grain size) due to its cubic crystal structure.

One of the problems with commercially available powders is that impurity phases and sulfur have been found in some powder batches. If there are impurities in excess of 0.01%, they preferentially reside at the grain boundaries, leading to excessive grain-boundary scatter in fine grained materials.

As described below, the present work has demonstrated that high purity and spherical-shaped nanoparticles (5–500 nm) of $MgAl_2O_4$ can be synthesized using a chemical synthesis method called the Diffusion Assisted Low Temperature (DALT) process. It is believed that this is the first time ever that phase pure nanopowders of $MgAl_2O_4$ with well-defined particulate morphology and high surface area have been synthesized.

Figure 1:
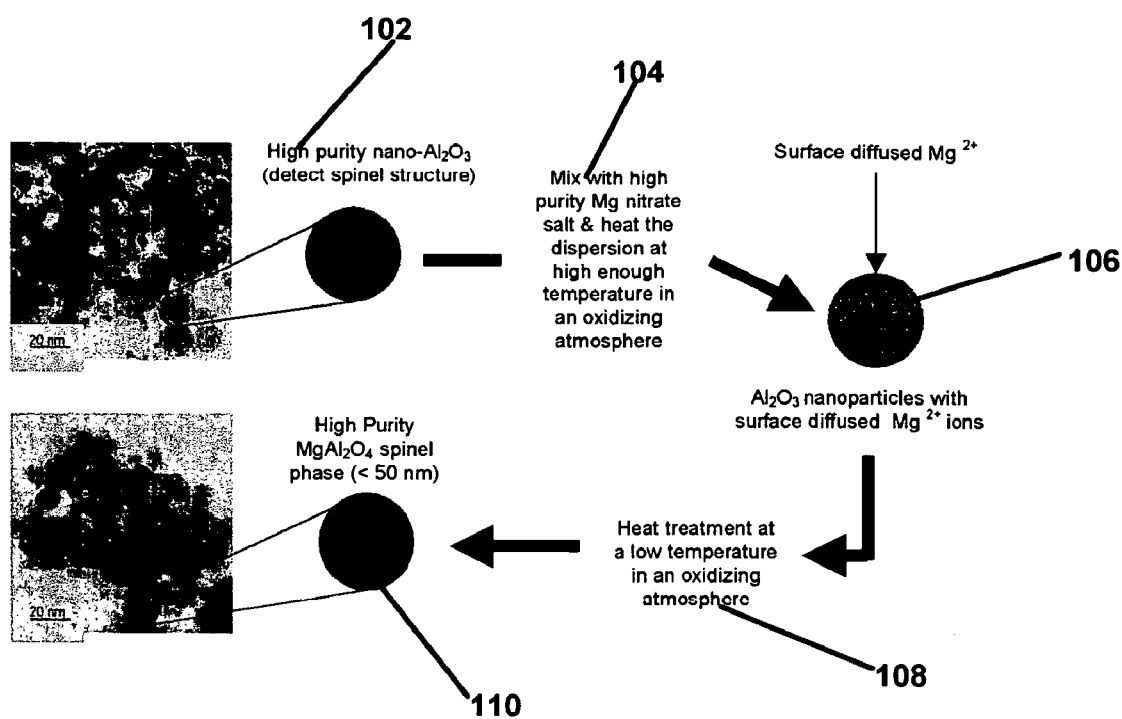
FIG. 1 is a schematic of the Diffusion Assisted Low Temperature (DALT) process, for producing high purity and phase pure doped and multi-component nanopowders.
Figure 2:
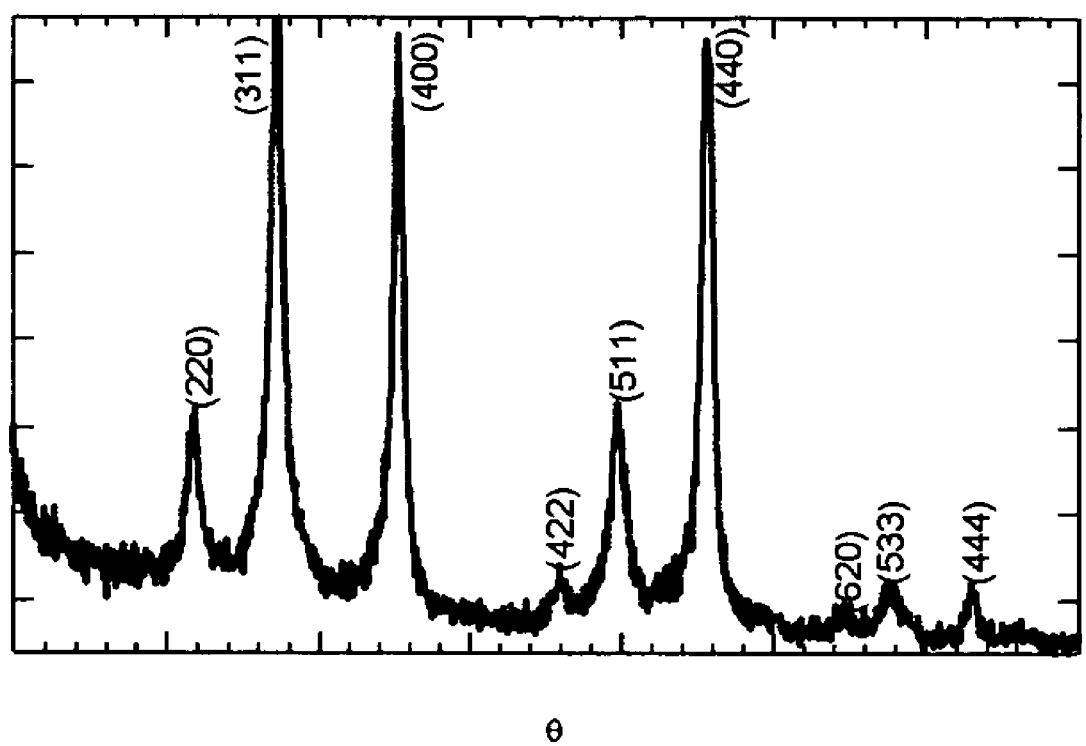
FIG. 2 is the x-ray diffraction pattern of the $MgAl_2O_4$ particles produced in accordance with the present invention.

FIG. 1 shows a schematic of the DALT process, along with TEM micrographs of $MgAl_2O_4$ and $\gamma$-$Al_2O_3$ nanopowders, the latter being the starting material. The DALT process produces multi-component nanoparticles with well defined particle characteristics and composition reproducibly, which has been a challenge for both vapor and liquid phase processes. In this process, spinel $\gamma$-$Al_2O_3$ nanoparticles 102 (primary particle size ~20 nm), produced using any of the vapor phase processes, are mixed with high purity magnesium nitrate 104 in the presence of an high boiling point organic solvent (boiling point ~250° C. or above). The solution is refluxed for 16 hrs, preferably by refluxing at ambient pressure, for a period of time between 16 and 24 hrs in order to promote the surface diffusion of cations of $Mg^{2+}$ into nanoparticles of $\gamma$-$Al_2O_3$ nanoparticles 106. After completing the reaction, the solvent is evaporated. The dried powder is heat treated 108 in an oxidizing atmosphere ($O_2$) at a relatively low temperature of about 800° C. to form the stoichiometric $MgAl_2O_4$ spinel phase nanopowders 110. In contrast, micrograined multicomponent powders are often formed by heat treating at temperatures well in excess of 1100° C. We have demonstrated that high quality and phase pure nanopowders of $MgAl_2O_4$ (as shown by the x-ray diffraction analysis pattern of FIG. 2) can be reproducibly synthesized using the DALT process: nanopowder attributes include high surface area (>100 $m^2$/g), small and discrete primary particles (~20 nm), phase pure and high purity.

Figure 3:
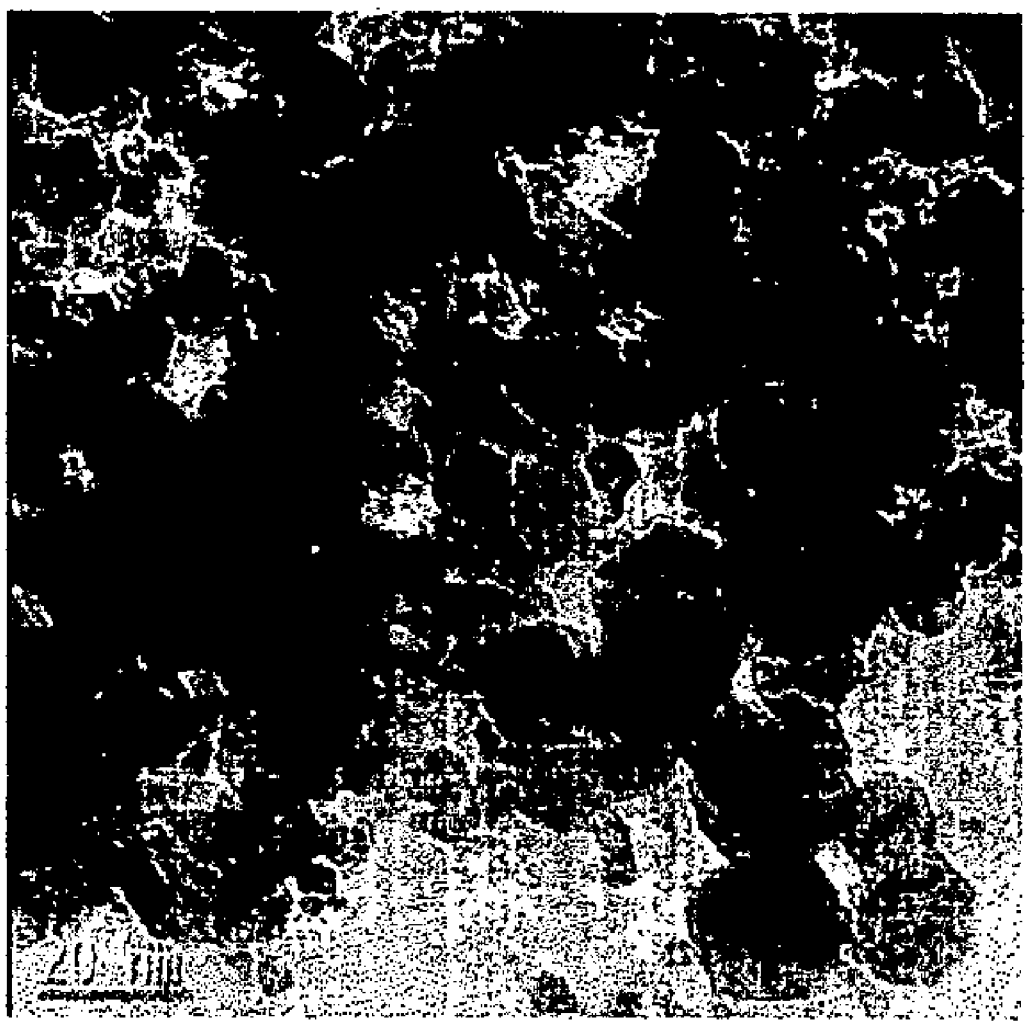
FIG. 3 is a TEM micrograph of $\gamma$-$Al_2O_3$ nanoparticles produced in accordance with the present invention.

Synthesis of $\gamma$-$Al_2O_3$ Nanopowders $\gamma$-$Al_2O_3$ spinel phase nanoparticles suitable for use in the present process are those that have a small particle size, <100 nm, and preferably less than 50 nm. For the powder used in the present process, the average aggregate size of $\gamma$-$Al_2O_3$ is ~100–150 nm. The surface area determined by BET nitrogen adsorption for the same batch of powder was found to be 120 $m^2$/g; the particle size calculated from the surface area data turns out to be ~14 nm. Powders are spherical in shape and possess a narrow size distribution as seen in the TEM photograph of FIG. 3, the $\gamma$-$Al_2O_3$ nanoparticles did not have any sulfur impurity, and the carbon impurity was ~0.1 wt %.

It is to be noted that $\gamma$-$Al_2O_3$ nanoparticles produced by various manufacturers have been used in this invention, and the results vary depending upon the particle characteristics, such as primary particle size and aggregate size. For example, as detailed below, the transformation temperature of $MgAl_2O_4$ raises on increasing the primary particle size.

Process Parameters for Synthesis of $MgAl_2O_4$ Nanopowders (a) EXAMPLES 1–3

Effect of Solvent $MgAl_2O_4$ nanopowders were produced using three different solvents: hexanol (boiling point 155° C.), decanol (boiling point 250° C.) and water (boiling point 100° C.). In case of hexanol, the dried powders were heat treated at 450° C., 550° C., 650° C., 750° C. and 1100° C. X-ray diffraction patterns of powders annealed at 1100° C. and 750° C. were analyzed. The powder annealed at 750° C. started to show spinel peaks; however, there was still substantial amount of a second phase, which was absent after annealing the powders at 1100° C. The sharp X-ray peaks of the spinel phase for the powder annealed at 1100° C., suggest the microcrystalline nature of $MgAl_2O_4$ particles. The surface area of the spinel powder produced by annealing at 1100° C. was 21 $m^2/g$, and the powder contained small amounts of impurity phases. Chemical analysis of the powder showed that the sulfur impurity was only 30 ppm. These results suggest that diffusion is insufficient when hexanol is used, since the boiling point is only 155° C.

To further improve the extent of surface diffusion of $Mg^{2+}$ in $Al_2O_3$ nanoparticles during the liquid phase processing step, a higher boiling point (~250° C.) alcohol, decanol, was used. X-ray diffraction data of powders annealed at different temperatures and prepared in a decanol solution are shown in were analyzed. Powders annealed at 500° C. contained $\gamma$-$Al_2O_3$ and an impurity phase. On the other hand, on annealing at 700° C., powders showed broad X-ray peaks of $MgAl_2O_4$ phase, and the predominant phase was $MgAl_2O_4$. The powders exhibited a small impurity peak at a $2\theta=64°$, which disappeared on annealing powders at a temperature $\geq 800°$ C. (see FIG. 2). The surface area of $MgAl_2O_4$ nanopowders, which were produced by annealing at 800° C., ranged between 110 and 143 $m^2/g$, and it was 88 $m^2/g$ for the powder annealed at 900° C. The primary particle size of the $MgAl_2O_4$ powder was ~20 nm.

Figure 5:
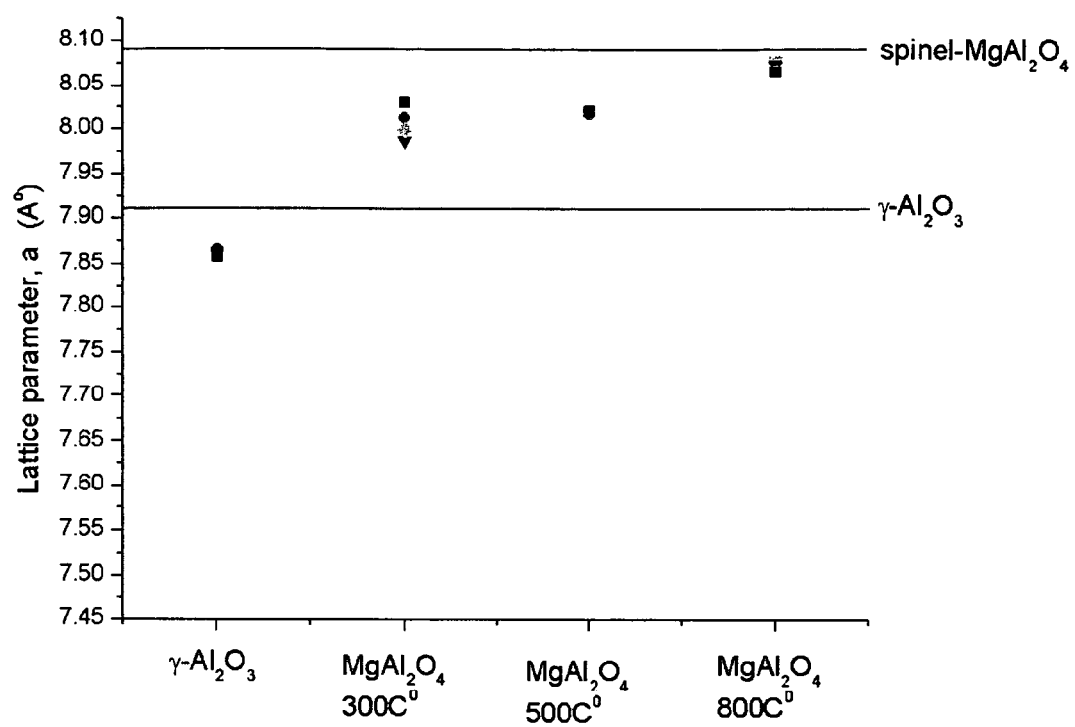
FIG. 5: illustrates the change in the lattice parameter of powder showing evolution of spinel phase with increasing heat treatment temperature.

A TEM micrograph, FIG. 4 (a), of a $MgAl_2O_4$ nanopowder annealed at 800° C. shows spherical-shaped nanoparticles of $MgAl_2O_4$ with an average primary particle size of ~20 nm. The diffraction pattern, FIG. 4 (b), on nanopowders shows diffused rings of $MgAl_2O_4$. Lattice parameter data (FIG. 5), which was calculated from the selective area diffraction (SAD) pattern of powders, of starting $\gamma$-$Al_2O_3$ and $MgAl_2O_4$ powder annealed at 300° C. display an increase in the lattice parameter value for the $MgAl_2O_4$ powder. This indicates that some amount of $Mg^{++}$ have diffused in $\gamma$-$Al_2O_3$ lattice at a temperature as low as 300° C. This is further supported by the Al and Mg composition mapping data, which was measured by advanced transmission electron microscopy techniques. On increasing the annealing temperature, $Mg^{++}$ completely diffused in $\gamma$-$Al_2O_3$ nanoparticles and fully transformed them into $MgAl_2O_4$ nanoparticles.

To further understand the effect of the starting solvent on $Mg^{++}$ diffusion in $\gamma$-$Al_2O_3$, the organic solvent was replaced with water. An appropriate amount of high purity magnesium nitrate salt was dissolved in water. $\gamma$-$Al_2O_3$ nanopowders were dispersed in the magnesium nitrate solution. The suspension was refluxed for a period of time between 16 and 24 hrs. After completing the refluxing step, water was evaporated. The dried powder was heat treated at 800 and 900° C. for 4 hrs in an oxygen atmosphere. It is clear from X-ray data that even after annealing at 900° C., the powder contained a significant amount of impurity phases. Additionally, surface areas of these powders were significantly lower in comparison to those synthesized using the decanol solution. The surface area was only 75 and 64 $m^2/g$ for powders annealed at 800° C. and 900° C., respectively.

(b) EXAMPLES 4–5

Effect of Primary Particle Size

Experiments were conducted to determine if the kinetics of the $MgAl_2O_4$ phase formation depends upon the primary particle size (or the surface area) of the starting $Al_2O_3$ powder, because the surface diffusion of $Mg^{2+}$ in $Al_2O_3$ particles should be a function of their surface/volume ratio. Powders using two commercially available nanopowders of $Al_2O_3$, (i) CP-1, surface area—30 $m^2/g$, average primary particle size—56 nm, and (ii) CP-2, surface area—15 $m^2/g$, average primary particle size—111 nm, were prepared in a decanol solution, while keeping all other processing parameters constant. X-ray data on powders annealed at 800° C. shows that the $MgAl_2O_4$ phase is a function of the primary particle size of $Al_2O_3$. Full transformation to spinel occurs when the primary particle is 14 nm (as mentioned earlier), partial transformation occurs when the primary particle size is 56 nm (CP-1), and no transformation is observed when the primary particle size is 111 nm (CP-2). It can be inferred from the data that precursor nanoparticles enable the formation of $MgAl_2O_4$ phase in the DALT process.

(C) EXAMPLE 6

Effect of Aggregate Size

To determine the effect of aggregate size of starting $Al_2O_3$ particles, $MgAl_2O_4$ powders are synthesized using two $Al_2O_3$ nanopowders that have similar surface areas but significantly different aggregate size: (i) CP-3, surface area—114 $m^2/g$, aggregate size—430 nm, and (ii) powder prepared in-house, surface area—120 $m^2/g$, aggregate size—150 nm. X-ray data of the spinel powder that was synthesized using CP-3 and annealed at 800° C. shows small peaks corresponding to an impurity phase, which disappear on annealing the powder at 800° C. However, in case of the $Al_2O_3$ powder prepared in-house, no impurity peak was observed when the powder was annealed at 800° C. X-ray data suggest that aggregate size of the starting nanopowder has a small effect on the kinetics of spinel phase formation.

Figure 6:
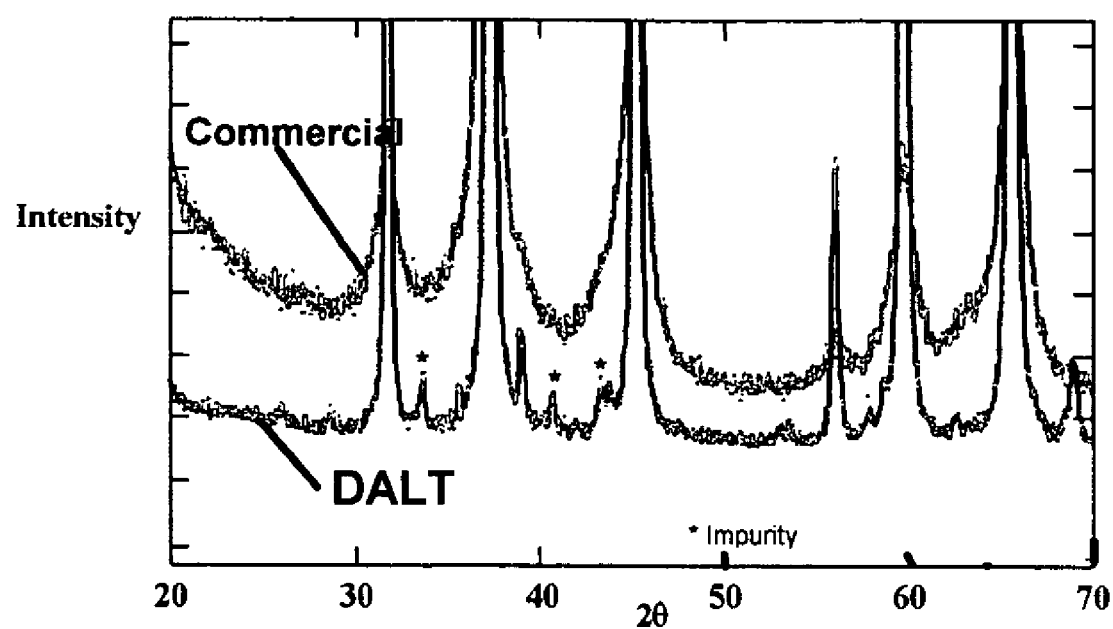
FIG. 6: is a comparison of XRD data of a commercial $MgAl_2O_4$ powder and the spinel nanopowder synthesized in accordance with the present invention.

Results support that it is possible to produce phase pure $MgAl_2O_4$ nanopowders with well defined particulate morphology and high surface area using the DALT process. As is evident from X-ray data (FIG. 6) of an $MgAl_2O_4$ nanopowder and a commercial micrograined 99.985% $MgAl_2O_4$ powder (obtained from Alfa Aesar), the commercial powder contains impurity phases (peaks are marked with asterisk) that are absent in the powder produced in this invention. It is to be noted that the presence of impurity phases in powders can significantly alter sinterability; further, the reproducibility of sintered components will be compromised.

Data clearly demonstrates that particle characteristics of $MgAl_2O_4$ nanopowders depend upon at least on two factors: (i) the boiling point and the type of solvent, and (ii) the particle characteristics of the starting $Al_2O_3$ powder.

Doped Nanopowders

EXAMPLE 7

Synthesis of Al Doped ZnO

The DALT process was used to dope nanosized ZnO with 2 wt % aluminum to increase its electrical conductivity. ZnO powder was purchased from Aldrich (Catalogue # 544906-50G). The surface area of the starting ZnO powder was 21 $m^2/g$. The powder was doped with Al by first dissolving Al$(NO_3)_3$ in 2-methoxyethanol, followed by addition of this solution in 1-decanol. The 2-methoxyethanol was used as Al$(NO_3)_3$ is not readily soluble in a high boiling point solvent such as decanol. Subsequently, ZnO powder was added in the 1-decanol solution. In order to create a doped rather than multi-component material the proportions of the oxide and the dopant are adjusted to the 0.5 to 3 wt % range associated with doping while much higher percentages are used for multi-component materials. The mixture was heated by refluxing for 16 hours. Decanol was distilled from the mixture after refluxing, using vacuum. Finally, the powder was heat treated at 350° C. in $N_2$ (rather than $O_2$ as $O_2$ would burn the residual decanol, which is not desirable) to remove residual decanol. The powder was compacted into 1.6 cm pellets by uniaxial pressing to measure sheet resistivity. Poly (vinyl butyral) was added as binder in the powder prior to compaction to increase the strength of the compacts. The compacts were heat treated at 650 and 850° C. in $O_2$. Additionally, the powder was also heat treated at 450, 650 and 850° C. in $O_2$ to compare the surface area of heat treated powders with the starting ZnO powder.

Table I shows the surface area of powder heat treated at different temperatures. The surface area of the powders heat treated at 450 and 650° C. is similar to that of the starting powder, implying that the crystal structure of ZnO powder hasn't changed during doping and heat treatment and that the doped material is still nano-sized. It is to be noted that the material heat treated at 850° C. has lost most of its surface area indicating that the particles have grown in size and are aggregating, so that heat treatment at high temperatures should be avoided to avoid losing the nano size of the doped ZnO powder.

TABLE I

Surface area of pure and doped ZnO powder

|  | Heat Treatment Temperature (° C.) | Surface Area ($m^2/g$) |
|---|---|---|
| Undoped ZnO | — | 21 |
| 2 wt % Al doped ZnO | 450 | 20.5 |
| 2 wt % Al doped ZnO | 650 | 21.4 |
| 2 wt % Al doped ZnO | 850 | 10.8 |

Example 8

Effect of Solvent

Another experiment was performed to examine if Al doping can also be achieved by simply dissolving $Al(NO_3)_3$ in deionized water followed by addition of ZnO nanopowder in the solution. The mixture was ultrasonicated to disperse the ZnO particles. Subsequently, the powder was dried and compacted into 1.6 cm pellets using similar uniaxial pressures used for the above described experiment. Again, poly (vinyl butyral) was added to the powder. The compacts were heat treated at 650° C. and 850° C. In addition, pure ZnO compacts were fabricated and heat treated under similar conditions for purposes of comparison.

Figure 7:
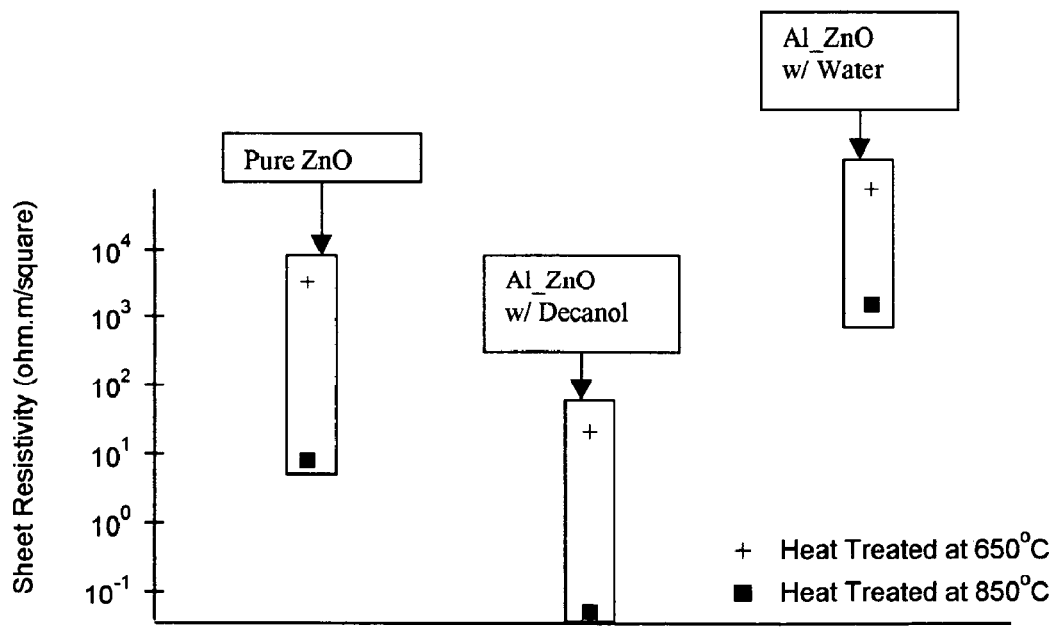
FIG. 7: illustrates the sheet resistivity of pure and Al doped ZnO powder synthesized using different processes.
Figure 9:
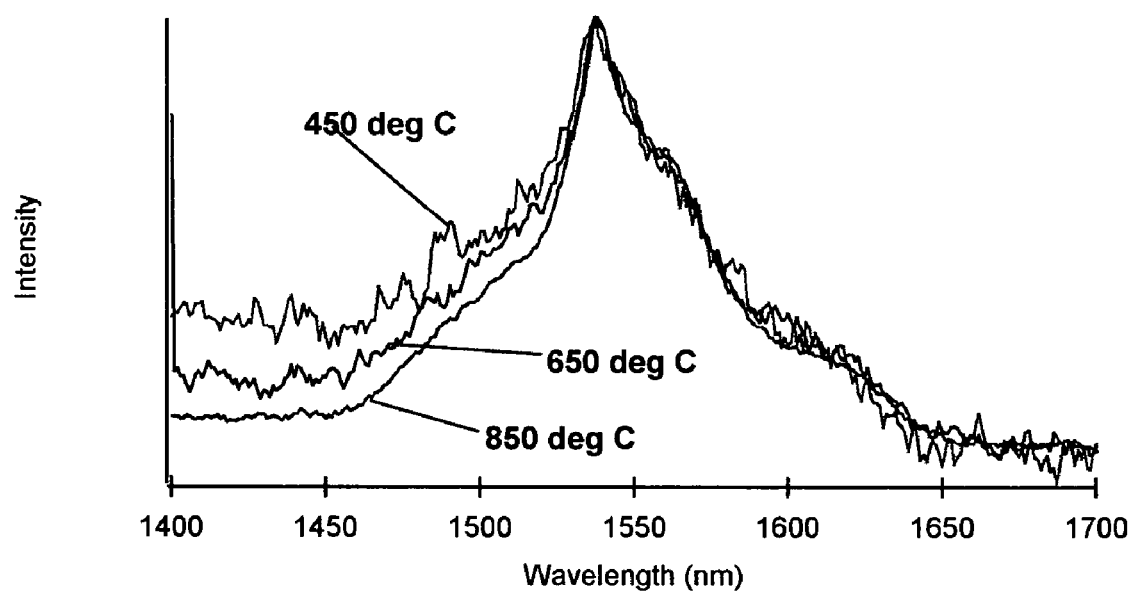
FIG. 9 shows the photoluminescence spectra of Er doped $TiO_2$ powder heat treated at different temperatures in accordance with the present invention.

The sheet resistance of compacts was measured using a four-point probe. All the samples were characterized at the same time to eliminate the effects of environmental variables. The sheet resistance values are not absolute but it gives an idea in the variation of sheet resistance with different processing conditions. FIG. 7 shows the sheet resistivity of the compacts. The sheet resistivity of Al-doped ZnO, synthesized in decanol solution is two orders of magnitude lower than pure ZnO, at both 650° C. and 850° C. heat treatment, validating that indeed Al has doped the ZnO powder. However, the sheet resistivity of Al doped powder synthesized in water solution is two orders of magnitude higher than pure ZnO powder, suggesting that aluminum oxide has formed a coating around ZnO particles hence making an insulating layer instead of Al atoms diffusing into the ZnO crystal. This increases the sheet resistivity of ZnO.

Example 9

Synthesis of Erbium Doped Titanium Oxide

Using the DALT process, nanosized $TiO_2$ was doped with 1 wt % erbium, to observe photoluminescence of Er ion in $TiO_2$ matrix, Erbium nitrate solution corresponding to 1 wt % erbium was dissolved in decanol. Nanosized $TiO_2$ powder was added in the solution. The mixture was refluxed for 16 hours. Subsequently, decanol was removed by vacuum distillation followed by heat treatment in $N_2$ atmosphere at 350° C. The powder was then heat treated at 450, 650, and 850° C. in oxygen atmosphere. Table II shows surface areas of powders heat treated at different temperatures. The surface area hasn't changed after heat treatment at 450 and 650° C. compared to the initial surface area, which suggests that the crystal structure $TiO_2$ nanopowders has not changed and that the doped material is still nano-sized. Again, it is to be noted that the material heat treated at 850° C. has lost most of its surface area indicating that the particles have grown in size and are aggregating, so that heat treatment at high temperatures should be avoided so as not to lose the nanosize feature of the doped $TiO_2$ powder.

TABLE II

Surface area of pure and Er doped $TiO_2$

|  | Heat Treatment Temperature (° C.) | Surface Area ($m^2/g$) |
|---|---|---|
| Pure $TiO_2$ | — |  |
| Er-doped $TiO_2$ | 450 | 73.6 |
| Er-doped $TiO_2$ | 650 | 82.3 |
| Er-doped $TiO_2$ | 850 | 37.2 |

Figure 8:
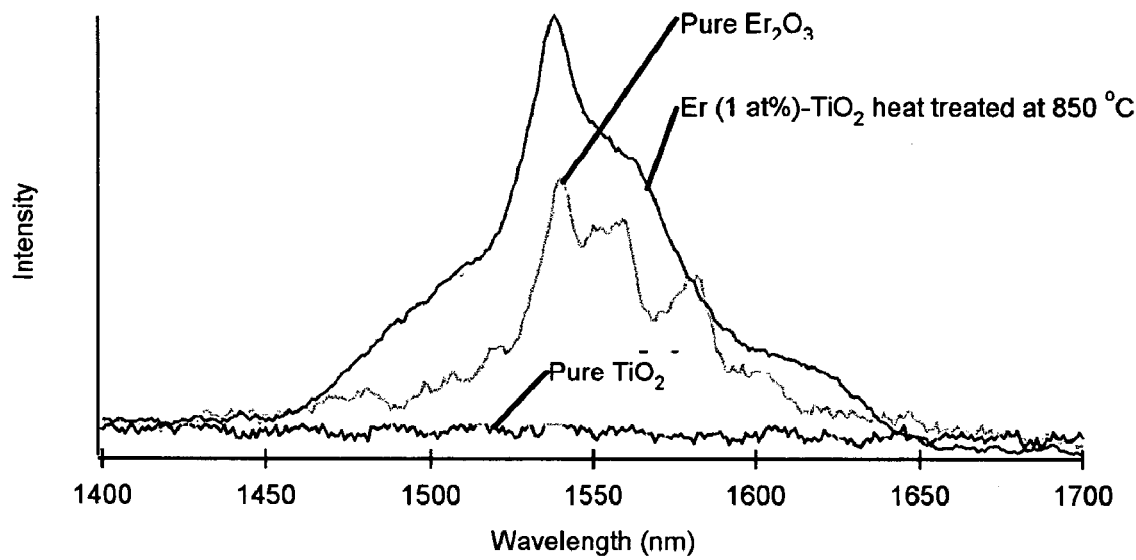
FIG. 8 illustrates the photoluminescence spectra of Er-doped $TiO_2$ nanopowder synthesized in accordance with the present invention versus pure $TiO_2$ and pure $Er_2O_3$.

FIG. 8 shows the photoluminescence spectra of Er doped $TiO_2$ (heat treated at 850° C.) as well as pure $TiO_2$ (used for the experiment) and $Er_2O_3$ for comparison. Pure $TiO_2$ does not show any photoluminescence, and the photoluminescence spectra of $Er_2O_3$ oxide is significantly different than that of Er doped $TiO_2$, confirming that $TiO_2$ has in fact been doped with Er. FIG. 8 shows the photoluminescence spectra of Er doped $TiO_2$ powder heat treated at different temperatures. Photoluminescence is observed at temperatures as low as 450° C. confirming that Er atoms have diffused in the $TiO_2$ matrix, even at such a low temperature. The measured spectra are essentially the same, for the various heat treatment temperatures, except at shorter wavelengths. This implies that certain "tuning" of the properties of the doped materials can be done by varying the process parameters.

Suitable single component oxides, for use in the present process include, but are not limited to: Silicon dioxide ($SiO_2$), titanium dioxide($TiO_2$), yttrium oxide($Y_2O_3$), aluminum oxide($Al_2O_3$), cerium oxide($CeO_2$), iron oxide (e.g., $Fe_3O_4$, FeO and $Fe_2O_3$), magnesium oxide (MgO), titanium oxide ($TiO_2$), zirconium oxide, ($ZrO_2$), tin oxide($SnO_2$) and zinc oxide (ZnO). The dopant or second component of the oxide may be any metal including "rare earth" metals, derived from cation salts such as metal nitrates, metal hydroxides, metal carbonates, metal chlorides, metal acetates, metal iodides, metal 2,4-pentadionate and metal alkoxides.

The organic solvent used in the present process should have a boiling point in the range of 79–300° C., preferably 150–300° C. The heating step preferably comprises refluxing between 5 to 100 hrs, more preferably 5 to 40 hrs and is conducted at an atmospheric pressure in the range of 0.5 to 10 atmospheres.

The heat treating step takes place at a temperature in the range of 250–1000° C., preferably in the range of 600–900° C. for a period of 1–24 hrs and more preferably for 2–8 hrs. The heat treatment takes place in an oxidizing atmosphere containing $O_2$ or air or, for certain applications, in an inert atmosphere containing $N_2$, He or Ar.

The process produces nanocrystalline multi-component or doped oxide nanoparticles with a particle size of 5–500 nm more preferably 20–100 nm; the collection of particles have an average secondary (or aggregate) particle size is in the range of 25–2000 nm, preferably of less than about 500 nm.

As is well known the process parameters set forth herein are for example only, such parameters can be adjusted in accordance with the teachings of this invention. The invention has been described with respect to preferred embodiments. However, as those skilled in the art will recognize, modifications and variations in the specific details which have been described and illustrated may be resorted to without departing from the spirit and scope of the invention as defined in the appended claims.

The invention claimed is:

1. A method of producing nanostructured multi-component or doped oxide particles, comprising the following steps:
   a. proportioning the salts of cations, which are either dopants or components of the final oxide, and a dispersion of nanoparticles of a single component oxide so as to form the proportions of the desired multi-component or doped oxide particles;
   b. dissolving the salts of cations, in an liquid organic solvent;
   c. adding the dispersion of nanoparticles of the single component oxide to the liquid solution;
   d. heating the liquid solution to facilitate diffusion of cations into the nanoparticles;
   e. separating the solids from the liquid solution; and
   f. heat treating the solids to form the desired crystal structure.

2. The method as claimed in claim 1, wherein the cation salt is selected from the group consisting of: metal nitrate, metal hydroxide, metal carbonate, metal chloride, metal acetate and metal iodide.

3. The method as claimed in claim 1, wherein the organic solvent has a boiling point in the range of 150–300° C.

4. The method as claimed in claim 1, wherein average primary particle size of single component oxide nanoparticles is in the range of 5–500 nm, and the average aggregate particle size is in the range of 25–2000 nm.

5. The method as claimed in claim 1, wherein the heating step comprises refluxing.

6. The method as claimed in claim 1, wherein the heating step comprises refluxing between 5 to 40 hrs.

7. The method as claimed in claim 1, wherein the heating step is conducted at an atmospheric pressure in the range of 0.5 to 10 atmospheres.

8. The method as claimed in claim 1, wherein solid particles are separated from the liquid solution by at least one of the following methods: filtration, evaporation and centrifuging.

9. The method as claimed in claim 1, wherein the solids are heat treated at a temperature of 250–1000° C.

10. The method as claimed in claim 1, wherein the solids are heat treated at a temperature of 600–900° C.

11. The method as claimed in claim 1, wherein the single component oxide is selected from the group consisting of: silicon dioxide, titanium dioxide, yttrium oxide, aluminum oxide, cerium oxide, iron oxide, magnesium oxide, titanium oxide, zirconium oxide, tin oxide and zinc oxide.

12. The method as claimed in claim 1, wherein the solids are heat treated for a period of 2–8 hrs.

13. The method as claimed in claim 1, wherein the solids are heat treated in an atmosphere containing $O_2$.

14. The method as claimed in claim 1, wherein the solids are heat treated in an atmosphere containing an inert atmosphere.

15. A method of producing a collection of multi-component or doped oxide nanoparticles, wherein the average primary particle size of the nanoparticles is in the range of 5–500 nm, and the average aggregate particle size is in the range of 25–2000 nm, the method comprising the following steps:
   a. providing the salts of cations, which are either dopants or components of the final oxide;
   b. providing a dispersion of nanoparticles of a single component oxide;
   c. proportioning the salts of cations and the dispersion of nanoparticles so as to form the proportions of the desired multi-component or doped oxide particles;
   d. dissolving the salts of cations in an liquid organic solvent;
   e. adding the dispersion of nanoparticles of the single component oxide to the liquid solvent solution;
   f. heating the liquid solution to facilitate diffusion of the cations into the nanoparticles;
   g. separating the solids from the liquid solution; and
   h. heat treating the solids to form the desired crystal structure of the final oxide.

16. The method as claimed in claim 15 wherein the multi-component nanoparticles have a first and second component, at least one of the first and second components being a metal.

17. The method as claimed in claim 15, wherein each of the nanoparticles has a particle size of 20–100 nm; the collection of particles having an aggregate particle size of less than 500 nm.

18. The method as claimed in claim 15, wherein the amount of cations is proportioned such that it acts as a dopant.

19. The method as claimed in claim 15, wherein the single component oxide is selected from the group consisting of: silicon dioxide, titanium dioxide, yttrium oxide, aluminum oxide, cerium oxide, iron oxide, magnesium oxide, titanium oxide, zirconium oxide, tin oxide and zinc oxide.

20. The method as claimed in claim 15, wherein the first component comprises γ-aluminum oxide and the second component comprises magnesium.

21. The method as claimed in claim 15, wherein the first component comprises titanium dioxide and the second component comprises a rare earth metal proportioned such that it acts as a dopant.

22. The method as claimed in claim 15, wherein the first component comprises zinc oxide and the second component comprises aluminum proportioned such that it acts as a dopant.

* * * * *

UNITED STATES PATENT AND TRADEMARK OFFICE
CERTIFICATE OF CORRECTION

| | | |
|---|---|---|
| PATENT NO. | : 7,182,929 B1 | Page 1 of 1 |
| APPLICATION NO. | : 10/920898 | |
| DATED | : February 27, 2007 | |
| INVENTOR(S) | : Singhal et al. | |

It is certified that error appears in the above-identified patent and that said Letters Patent is hereby corrected as shown below:

Delete column 1, lines 14-16 and replace with

--This invention was made with Government support under contact DAAH01-03-C-R147 awarded by the U.S. Army SBIR. The Government has certain rights in the invention.--

Signed and Sealed this
First Day of March, 2011

David J. Kappos
*Director of the United States Patent and Trademark Office*